Patented Nov. 17, 1931

1,832,491

UNITED STATES PATENT OFFICE

CLAUDE LOCREILLE, OF FAUQUEZ, BELGIUM

PROCESS OF MANUFACTURING MARBLED AND MULTICOLORED GLASS

No Drawing. Application filed March 27, 1930, Serial No. 439,519, and in Belgium April 9, 1929.

Hitherto, to obtain a marble or multi-colored effect on glass plates or other glass articles, two processes were chiefly resorted to, one of them consisting in adorning one of the sides of the glass by painting or enamelling so that the marblings or other patterns produced be visible from the other side of the glass owing to its transparency, the other method consisting in superposing several distinct layers of variously colored glass and then grinding off one or more of these layers at some places thereby permitting the underlying layer or layers to appear.

The present invention has for its object to provide an improved process and it essentially consists in mingling glasses of different colors while they are in molten condition, this being done in such a manner that their colors do not fuse into each other but remain quite distinct. In this way I obtain veins, marblings and multicolored effects formed inside the body of the glass article and apparent on both sides of it, which are indelible and perfectly reproduce the natural veins of marble and other stones it is desired to imitate.

In carrying out this process, homogeneous masses of differently colored glass having substantially the same composition or compositions differing as little as possible from each other are prepared separately in crucibles or special furnaces. Into the particular glass having the color intended for the ground of the finished article, the various glasses having other colors are successively poured at different places in greater or less amount according to the result to be obtained, and the glasses are rapidly mingled together.

The temperature of the ground color glass must be as high as possible, up to say 1400° C., whereas the glasses to be added thereto may be at a lower temperature, up to say 1000 to 1200° C. at the time of operation. The observance both of these temperature differences and of the condition that the different glasses employed shall have substantially the same base or composition, is indispensable if good results are to be obtained.

The mass of multicolored glass obtained by the present process may subsequently be transformed in any desired manner into sheets, plates or any other articles.

I claim

1. A process of manufacturing marbled and multi-colored glass, comprising preparing masses of glass of different colors having substantially the same composition, melting such masses of glass, bringing one of said masses to a condition of great fluidity, bringing the others of said masses to a condition of slightly less fluidity, and pouring separate quantities of said other masses at different spots into said first mentioned mass.

2. A process of manufacturing marbled and multicolored glass, comprising preparing a mass of ground color glass and masses of differently colored glasses having substantially the same composition, melting said masses of glass, the ground color glass being brought to a temperautre about 100 to 200° C. above the temperature of said other masses of glass, and pouring separate quantities of said other masses of glass into said ground color glass.

3. A process of manufacturing marbled and multicolored glass, comprising preparing a mass of ground color glass and masses of variously colored glasses having substantially the same composition, melting said ground color glass at a temperature between 1200 and 1400° C., melting said variously colored glasses at temperatures between 1000 and 1200° C., separately pouring quantities of said variously colored glasses into said ground color glass at different spots, and rapidly mingling said masses together.

In testimony whereof I affix my signature.

CLAUDE LOCREILLE.